United States Patent [19]

Zweig

[11] Patent Number: 5,054,394

[45] Date of Patent: * Oct. 8, 1991

[54] ISOPROPYL ALCOHOL-FREE CATALYTIC FOUNTAIN SOLUTION CONCENTRATE AND METHOD FOR INTRODUCING A CATALYTIC AGENT INTO LITHOGRAPHIC PRINTING INK

[76] Inventor: Leon A. Zweig, 2336 Bennett Ave., North Bellmore, N.Y. 11710

[ * ] Notice: The portion of the term of this patent subsequent to Mar. 6, 2007 has been disclaimed.

[21] Appl. No.: 627,840

[22] Filed: Dec. 17, 1990

Related U.S. Application Data

[60] Continuation-in-part of Ser. No. 425,063, Oct. 23, 1989, Pat. No. 4,982,661, which is a division of Ser. No. 304,594, Feb. 1, 1989, Pat. No. 4,906,296.

[51] Int. Cl.$^5$ ............................ C09D 5/20; B41F 7/24
[52] U.S. Cl. .......................................... 101/451; 106/2
[58] Field of Search ............................ 106/2; 101/451

[56] References Cited

U.S. PATENT DOCUMENTS

| | | | |
|---|---|---|---|
| 3,682,688 | 8/1972 | Hughes et al. | 427/384 |
| 4,247,328 | 1/1981 | Lawson et al. | 106/2 |
| 4,278,467 | 7/1981 | Fadner | 106/2 |
| 4,548,645 | 10/1985 | Thiebaut | 106/2 |
| 4,560,410 | 12/1985 | Burns et al. | 101/451 X |
| 4,604,952 | 8/1986 | Daugherty | 101/451 |
| 4,659,848 | 4/1987 | Kay et al. | 556/24 |
| 4,705,568 | 11/1987 | Kay et al. | 106/26 |
| 4,764,213 | 8/1988 | Gventer et al. | 106/2 |
| 4,865,646 | 9/1989 | Egberg | 106/2 |
| 4,906,296 | 3/1990 | Zweig | 101/451 X |
| 4,982,661 | 1/1991 | Zweig | 101/451 |

FOREIGN PATENT DOCUMENTS 2901664 7/1979 Fed. Rep. of Germany ...... 101/451

*Primary Examiner*—Clifford D. Crowder
*Attorney, Agent, or Firm*—Ostrolenk, Faber, Gerb & Soffen

[57] ABSTRACT

A fountain solution concentrate for introducing a catalytic agent into lithographic printing ink. The catalytic agent is formulated into a catalytic fountain solution, transported via the fountain solution to the ink and infused therein to impart desired qualities to the ink. An organic titanate compound is used as a catalytic agent in conjunction with apparatus to initiate drying for preventing ink offset and producing clean, sharp printing. The concentrate does not require the addition of alcohol.

33 Claims, No Drawings

ISOPROPYL ALCOHOL-FREE CATALYTIC FOUNTAIN SOLUTION CONCENTRATE AND METHOD FOR INTRODUCING A CATALYTIC AGENT INTO LITHOGRAPHIC PRINTING INK

This application is a continuation-in-part of application Ser. No. 425,063, filed Oct. 23, 1989, now U.S. Pat. No. 4,982,661, which is a divisional of application Ser. No. 304,594, filed Feb. 1, 1989, now U.S. Pat. No. 4,906,296. The disclosure of said '661 and '296 patents are hereby incorporated by reference.

BACKGROUND OF THE INVENTION

1. Field of the Invention

The present invention relates to lithographic printing.

2. Description of the Related Art

Lithographic printing is a process which utilizes a coated metal or paper plate containing an image (hydrophobic) area and a non-image (hydrophilic) area.

The image area will accept ink and the non-image area will accept water.

While some water will emulsify with the ink, no ink can be allowed to adhere to the non-image area. When it does, it is referred to as scumming and action must be taken to clean and coat the plate with gum to correct the problem.

A printing station on a typical lithographic press contains an inking unit, a dampening unit, a plate cylinder, a blanket cylinder, a nip roll and a gripper bar system to transport the sheet on a sheet fed press or a series of rollers to transport a web. During the printing cycle, the ink is transferred to the plate from the ink unit through a series of rollers and the water which contains other components is transferred from the dampening unit to the plate, the combination of ink and water are transferred to the blanket cylinder which is covered with a rubber or urethane blanket and then to the substrate.

On sheet fed presses, the printed sheets are conveyed to a delivery pile where the sheets are stacked one on top of the other. The ink is still wet at this point and must be prevented from transferring or offsetting from the printed surface to the bottom of the next sheet.

Conventional sheet fed presses incorporate spray units in the delivery section which spray the sheets with a film of powder to reduce or prevent the offsetting condition until the ink dries.

Another method of coping with the problem is to apply an aqueous coating to the printed surface and then dry it with infrared radiation.

Conventional high speed web presses use specially formulated heat set inks and incorporate very large drying system which are expensive to purchase, expensive to operate, and require highly sophisticated emission control equipment in order to comply with clean air standards.

With known lithographic printing processes, changes in printing press performance and printing results may be affected through variation of the ink formulations. Catalytic agents are introduced directly into the ink. Printing inks have been modified in this way for various specific requirements such as adhesion, abrasion resistance, ductility hardness, opacity, transparency, color, shading, gloss and density.

For example, U.S. Pat. No. 3,682,688 to Hughes et al., discloses adding a compound to lithographic printing ink to accelerate its drying. U.S. Pat. Nos. 4,659,848 and 4,705,568 both to Kay et al., add compounds to lithographic ink to promote its adhesion to plastic substrates.

U.S. Pat. No. 4,906,296 to Zweig discloses a fountain solution for transporting catalytic cross-linking agents to lithographic printing inks, infusing the inks with the catalytic cross-linking agents and making them reactive to ultraviolet radiation, infrared radiation or hot air. When this fountain solution is used, in conjunction with the described drying apparatus, the ink does not offset even when no spray powder is used. It is necessary however, to add from 10% to 20% isopropyl alcohol to the fountain solution mixture in order to keep the printing plate from scumming. This is undesirable since the isopropyl alcohol evaporates and mixes with other elements to form ozone in the atmosphere.

SUMMARY OF THE INVENTION

Accordingly, it is an object of the present invention to provide an improved formulation of a catalytic fountain solution which keeps the printing plate clean without the need for alcohol.

Another object of the invention is to speed the drying time of the printed substrate.

A further object of the invention is to provide an alternate means of initiating the cross-linking of the ink.

These objectives, and other objectives, are achieved by providing a novel fountain solution concentrate which transports a catalytic cross-linking agent to lithographic printing ink and infuses the catalytic agent into the ink. The concentrate includes water, gum, glycol and a catalytic cross-linking agent which cross-links the ink upon exposure to ultraviolet radiation, infrared radiation, blowing hot air, blowing cold air or any combination thereof. The fountain solution may also include one or more of the following: a tackifier, a pH adjuster and a blending agent. It has been found that with the concentrate of the invention, alcohol (more specifically, isopropyl alcohol) advantageously can be eliminated from the fountain solution. Preferably, the gum is a natural gum (most preferably Gum Arabic), the glycol is propylene glycol, and the catalytic cross-linking agent is an organic titanate compound, most preferably a titanate chelate. The concentrate is preferably acidic, having a pH between about 3 and about 5, most preferably between about 4 and about 5.

A process is also provided for imparting catalytic, cross-linking qualities to ink in a lithographic printing process which includes dampening and inking systems for providing fountain solution and ink, respectively. The process includes introducing a catalytic fountain solution formulated from the concentrate discussed above into the dampening system, transporting the catalytic agent to the ink via the fountain solution and infusing the catalytic agent into the ink. Concentrate may be introduced into the inking system in addition to the dampening system when it is desirable to further reduce the drying time of the ink.

DETAILED DESCRIPTION OF THE PREFERRED INVENTION

The present invention is directed to an improved process for imparting reactive qualities to lithographic printing inks by means of catalytic fountain solutions containing catalytic cross-linking agents. The catalytic agents are brought into contact with the inks through the dampening systems and the inking units. The catalytic agents are infused into the inks and impart specific reactive qualities to the inks.

By the term "catalytic agent", is meant a substance which physically or chemically imparts reactive qualities to the ink. The catalytic agents which may be utilized in accordance with the present invention may be any type known to impart a specific property to the inks. Examples of catalytic agents are those used to achieve improved adhesion, abrasion resistance, ductility, hardness, opacity, transparency, color, shading, gloss, etc. The catalytic agent may be a mixture of such agents.

A catalytic agent, as defined above, is incorporated into a fountain solution in an amount which will impart to the ink, the desired quality. The upper limit of the amount of catalytic agent which may be incorporated into the fountain solution will be governed by the balance of other components necessary to achieve the required overall performance characteristics of the fountain solution which include keeping the hydrophilic areas of the plate from scumming and maintaining an optimum ink-water balance. Other non-catalytic agents in addition to the catalytic agent may also be added to the ink and or overprint varnish via the fountain solution. For example, compounds containing active hydrogen groups, such as acrylic acid (used in aqueous coatings to improve gloss and rub resistance) may be introduced into the ink and or overprint varnish with the catalytic agent.

The fountain solution formula of the present invention incorporates the catalytic agent therein.

The concentrate of the invention includes water, gum, glycol and the catalytic agent. The glycol, which is preferably propylene glycol but may be ethylene glycol, allows for the elimination of isopropyl alcohol from the concentrate. Preferably, the concentrate includes water in an amount between about 15 and about 18%, most preferably about 15.4 and about 17.4%, gum in an amount between about 18 and about 20%, most preferably between about 19 and about 19.6%, glycol in an amount between about 22 and about 30%, most preferably between about 24 and about 26%, and catalytic agent in an amount between about 19 and about 24%, most preferably between about 21 and about 22%. All percentages expressed throughout this specification and claims are weight percent, based upon the total weight of the fountain solution concentrate.

The water, gum, glycol and catalytic agent are critical to the operation of the concentrate in accordance with the invention. Other preferred components of the concentrate include a tackifier, a pH adjuster and a blending agent.

As the tackifier, sugar syrup in an amount between about 3 and about 5%, most preferably between about 3.5 and about 4%, is preferably included in the concentrate to promote adherence of the gum to the printing plate. Other suitable tackifiers will be apparent to one skilled in the art.

The fountain solution concentrate is preferably acidic, and preferably has a pH between about 3 and about 5, most preferably between about 4 and about 5. The pH of the concentrate is preferably adjusted to be within these ranges by including in the concentrate a combination of pH modifiers comprising citric acid in an amount between about 3 and about 5%, most preferably about 3.5 and about 4%, phosphoric acid in an amount between about 0.5 and about 1%, most preferably between about 0.75 and about 0.9%, and ammonia (14% solution) in an amount between about 5 and about 7%, most preferably between about 5.5 and about 6.5%. Other pH adjusters will be apparent to one skilled in the art.

As a blending agent, propylene glycol methyl ether is preferably included in the concentrate in an amount between about 3 and about 4%, most preferably, between about 3.3 and about 3.7%, to promote blending of the other components of the concentrate. An especially preferred blending agent is Dowanol PM which is available from Dow Chemical Company. Other suitable blending agents will be apparent to one skilled in the art.

Other optional ingredients of the concentrate include a fungicide, a surfactant and a defoaming agent.

The fungicide, which may be a combination of fungicides, is preferably included in the concentrate in an amount between about 0.1 and about 0.3%, most preferably between about 0.2 and about 0.25%. An especially preferred fungicide is E-1492 fungicide which is available from GAF. The surfactant, which may be a combination of surfactants, is preferably included in the concentrate in an amount between about 0.4 and about 1%, most preferably between about 0.6 and about 0.8%. An especially preferred surfactant is Surfynol 104E available from Air Products which is also a defoamer. Other fungicides, surfactants, defoaming agents and levels thereof will be apparent to one skilled in the art.

The inks suitable for having the catalytic agent infused therein in accordance with the invention, are any of the known lithographic printing inks including but not limited to Inmont, Superior, Sinclair & Valentine, Beacon, Wilkoff, Gans or Kohl & Madden. Other inks will be apparent to one skilled in the art.

The catalytic fountain solution is used in a lithographic printing press in the normal manner. It is transported via the dampening system and emulsifies with the ink, infusing the catalytic agent therein at the point where the ink and the fountain solution mix. The present invention is useful in all the known types of lithographic printing dampening systems including those that utilize non-contacting brush or spray processes, in addition to the contacting conventional ductor-type or continuous process.

The above-described catalytic agent infusion process may be utilized to control ink offset in lithographic printing processes. In this regard, a catalytically effective amount of a cross-linking agent is used as the catalytic agent which is incorporated in the fountain solution concentrate which is formulated as a fountain solution for infusion of the catalytic agent into the ink. Preferably, the cross-linking agent is an organic titanate compound. The ink having the organic titanate catalytic agent infused therein is then exposed to ultraviolet or infrared radiation, or blowing hot or cold air, or any combination thereof to activate the compound and trigger the cross-linking of the ink surface. A suitable organic titanate compound is a water soluble titanate chelate designated MPD-6031 manufactured by E. I. du Pont de Nemours & Company. Other catalytic agents will be apparent to one skilled in the art.

The catalytic fountain solution concentrate is added to the dampening unit recirculating tank in the ratio of about 8 liquid ounces of concentrate to a gallon of water. As little as 6 ounces per gallon may also be effective in some applications, as in less ink coverage. The printing operation then proceeds in the normal manner except that the spray powder unit is turned off. Due to the wide range of variables in equipment configuration it may be necessary to add up to another 3 ounces of concentrate or 6 ounces of propylene glycol per gallon of water in order to prevent scumming of the plates. However, no isopropyl alcohol is required.

In conjunction with transport of the catalytic agent from the dampening unit, about one ounce of catalytic fountain solution concentrate per pound of ink may also be added to the inking unit when it is desirable to further reduce the drying time of the ink. This procedure is especially effective when printing with an overprint varnish.

After the titanate chelate is infused into the printing ink and the ink has been applied to the substrate, the printed substrate is exposed to infrared radiation, ultraviolet radiation, a hot air or a cold air blowing system, or any combination thereof.

The cold air blowing system may be used in combination with the infrared or ultraviolet radiation system to reduce heat buildup in the lithographic press.

The cold air blowing system may be used by itself to initiate the cross-linking reaction and prevent ink offset but the drying time will be longer than when heat is applied. The use of a cold air blowing system to initiate the cross-linking reaction will prove of importance where either the equipment or the substrate material may be heat sensitive.

The printed sheet may be exposed to any suitable apparatus for a suitable amount of time to initiate the cross-linking reaction. The particular amount of time that the ink is exposed to the radiation or blowing system will depend on the amount of radiating or blowing equipment. The printed substrate is preferably exposed to a radiation system for about one-fifth of a second.

The radiation or blowing system may be mounted in the lithographic press at a position which allows it to radiate or blow on the ink and trigger the cross-linking reaction of the ink. For example, the radiation or blowing system may be mounted between the last printing station and the sheet delivery. Blowing systems may be mounted after each printing station in the lithographic press.

In place of spray powder, high speed web offset presses use large hot air drying systems in conjunction with chill rolls to dry the ink so that the web can be rewound into a roll without ink offsetting or blocking. Normally, specially formulated heat set inks are used in web printing.

The drying systems are expensive to purchase and expensive to operate. When the regular fountain solution is replaced with the catalytic fountain solution, it is possible to reduce the operating temperature significantly with a savings in energy cost and improvement in printing quality. The improvement in operating efficiency, makes it possible to reduce the size of the drying system.

The MPD-6031 titanate is an excellent ultraviolet absorber and will react to ultraviolet radiation which makes it feasible to replace the conventional hot air dryer in whole or in part, with an ultraviolet curing system resulting in a further reduction in the dryer size. It also makes it feasible to use conventional lithographic inks as well as heat set inks on web offset presses.

Examples I–IX illustrate the fountain solution concentrate and its use in lithographic printing processes in accordance with the present invention.

EXAMPLE I

A fountain solution concentrate was formulated having the following composition:

| Component | Grams Per Lb. of Fountain Solution Concentrate | Weight % |
| --- | --- | --- |
| Water | 70.00 | 15.40 |
| Gum Arabic 14 Baume | 89.00 | 19.60 |
| Sugar 39 Baume | 16.00 | 3.52 |
| Propylene Glycol | 115.00 | 25.30 |
| Citric Acid | 18.00 | 3.96 |
| Phosphoric Acid | 4.00 | 0.88 |
| Ammonia (14%) | 27.00 | 6.09 |
| E-1492 Fungicide | 1.00 | 0.22 |
| Dowanol P.M. | 16.00 | 3.52 |
| MPD-6031 | 94.00 | 20.70 |
| Surfynol 104E | 4.00 | 0.81 |
| Total | 454.00 grams | 100.00 |

EXAMPLE II

On a Roland 6 color lithographic press operating at speeds of 300' to 400' per minute, the original fountain solution was replaced with catalytic fountain solution containing the fountain solution concentrate of Example I in a ratio of 9 liquid ounces of concentrate per gallon of water. No alcohol or other chemicals were added. Most of the printing was done on 90 lb. coated text paper with Superior inks. On all types of coverage including 4 color process and large area solids the spray powder was shut off and the sheets were exposed to a medium wave infrared drying system. There was no evidence of ink offset. In addition, it was reported that the drying time was as much as 50% faster than normal. The test was conducted at The Nimrod Press, in Boston, Mass. for an entire week.

EXAMPLE III

On a Roland 6 color lithographic press operating at speeds of 300' to 400' per minute, the original fountain solution containing 15% alcohol, was drained from the dampening system and replaced with catalytic fountain solution containing the fountain solution concentrate of Example I in a ratio of 8 liquid ounces of concentrate per gallon of water. No alcohol or other chemicals were added. The job on the press at the time was food carton with very heavy ink coverage on a clay coated board, with Sinclair & Valentine ink. The spray powder unit had been set at the upper limit due to ink offsetting problems. The spray powder was shut off for the test and the printed sheets were exposed to a short wave infrared drying system in the delivery. There was no evidence of ink offset and the drying time was significantly faster. Subsequent tests on the same equipment were conducted with repeatable performance results. The test was conducted at Federal Paper Board Co., in York, Pa.

EXAMPLE IV

On a Roland 6 color lithographic press operating at speeds of 300' to 400' per minute, the original fountain solution containing 15% alcohol, was drained from the dampening system and replaced with catalytic fountain solution containing the fountain solution concentrate of Example I in a ratio of 8 liquid ounces of concentrate per gallon of water. No alcohol or other chemicals were added. Printing tests were conducted on clay coated and solid bleached sulfate boards using Eagle inks. Both four color process and solid area coverage designs were printed without spray powder and exposure to a short wave infrared drying system. There was no evidence of ink offsetting and the drying time was significantly shorter than normal. The test was conducted at Federal Board Co. in Versailles, Conn.

EXAMPLE V

On a Harris 5 color lithographic press operating at a speed of 300' per minute, the original fountain solution containing 15% alcohol was drained from the dampening system and replaced with catalytic fountain solution containing the fountain solution concentrate of Example I in a ratio of 8 liquid ounces of concentrate per gallon of water. No alcohol or other chemicals were added. An additional 1 ounce of concentrate per pound of ink was added to the ink unit. The printing test was conducted on solid bleached sulfate board with Vivid Ink Co. inks with very heavy coverage. The spray powder was turned off and the sheets were exposed to a short wave infrared drying system. There was no evidence of ink offset and the drying time was extremely short. It was reported that the quality of the printing was far superior to that of the normal runs. The test was conducted at Diamond Paper Box Company in Philadelphia, Pa.

EXAMPLE VI

On a Harris 4 color lithographic press operating at a speed of 300' per minute, the original fountain solution containing 15% alcohol was drained from the dampening system and replaced with catalytic fountain solution containing the fountain solution concentrate of Example I in a ratio of 8 liquid ounces of concentrate per gallon water. No alcohol or other chemicals were added. The printing test was conducted on solid bleached sulfate board with Vivid Ink Co. process black, blue, red and yellow inks with very heavy coverage. The spray powder was turned off and the sheets were exposed to a cold air blowing system only. There was evidence of ink offset before the blowing system was turned on, but no ink offset occurred after the blowing system was activated. The drying time was slightly faster than normal. The test was conducted at Diamond Paper Box Company in Philadelphia, Pa.

EXAMPLE VII

On a Solna 5 color lithographic press operating at a speed of 250' per minute, the original fountain solution was drained from the dampening system and replaced with catalytic fountain solution containing the fountain solution concentrate of Example I in a ratio of 8 liquid ounces of concentrate per gallon of water. No alcohol or other chemicals were added. The printing test was conducted on 70 lb. coated stock for a magazine, printed on both sides with 2 pages per side, in 2 passes, 4 color process plus line blue and using G.P.I. inks. The spray powder was turned off and the printed sheets were exposed to a short wave infrared drying system. The normal load height for this job with spray powder would be 13", but for the test the load height without spray powder was 26". There was no evidence of ink offset and the drying time was estimated to be 50% faster than normal. It was reported that the print quality was superior to that of a normal run. The test was conducted at Anstadt Printing Craftsman in York, Pa.

EXAMPLE VIII

On a Shinohara 5 color, 19"×26" lithographic press the original fountain solution containing 12% alcohol was drained from the dampening system and replaced with catalytic fountain solution containing the fountain solution concentrate of Example I, in a ratio of 8 liquid ounces of concentrate per gallon of water. No alcohol or other chemicals were added. A 4 color process job was printed on 70 lb. Mead paper, coated both sides, with Braden-Sutphin blue, black, red and yellow inks, with no alcohol or spray powder, at a speed of 7,000 sheets per hour. Where the normal setting for the spray powder would be at #6 and the delivery pile limited to 2,500 sheets, the pile height for the test was allowed to reach 5,500 sheets. In addition the second side was printed immediately after the first side was completed which represented a much shorter drying time than normal. There was no trace of ink offset and the ink dot pattern was much sharper than normally attained. The test was conducted at Anstadt Printing Craftsmen in York, Pa.

EXAMPLE IX

On a model 522 2 color Ryobi duplicator offset press, the fountain solution containing 15%–18% alcohol was drained from the dampening system and replaced with catalytic fountain solution containing the fountain solution concentrate of Example I, in a ratio of 8 liquid ounces of concentrate per gallon of water. No alcohol or other chemicals were added.

A 2 color job was printed on 70 lb. stock, coated both sides with G.P.I. red and black inks, "3M" paper printing plates, and no spray powder at a speed of 6,500 sheets per hour. The ink coverage was heavy and covered large areas which would normally require the highest setting of the spray powder. There was no ink offset and gloss level was higher than normally attained. The test was conducted at Wheatland Press in Lancaster, Pa.

As illustrated by the above examples and tests conducted in conjunction therewith, the catalytic agent process of the present invention has a number of advantages. A greater degree of flexibility is achieved with offset lithographic printing according to the present invention since a specialty ink is not needed. The ink characteristics can be varied simply by introducing modified fountain solutions via the lithographic press dampening and inking systems. Anti-offset spray powders are not required to prevent ink offset. This reduces the equipment maintenance needed when these powders are employed. Additionally, the need for applying a protective coating to reduce ink offset is eliminated as well as the apparatus for applying the coating.

A summary of reports from actual tests of the present invention in production facilities states the following: Higher run loads save floor space, quicker drying speeds up production, better ink flow, cleaner printing plates, sharper color, mean better quality, no odor improves operator moral, environmentally safe, no special disposal, no alcohol evaporation means cleaner air.

As illustrated by Example V, it is possible to introduce the catalytic fountain solution concentrate into the system through the ink unit in conjunction with the dampening unit and reduce the drying time of the printed product.

As illustrated by Example VI, it is possible to achieve the cross-linking action of the ink with only a cold air blowing system when heat is objectionable.

While certain representative embodiments and details have been shown for the purpose of illustrating the invention, it will be apparent to those skilled in the art that various changes may be made therein without departing from the spirit or scope of the invention.

What is claimed is:

1. A fountain solution concentrate for transporting a catalytic cross-linking agent to lithographic printing ink and infusing said catalytic, cross-linking agent into said ink, said fountain solution concentrate consisting essentially of water, gum, glycol and a catalytic cross-linking agent adapted to cross-link said ink upon exposure to ultraviolet radiation, infrared radiation, blowing hot air or blowing cold air.

2. The fountain solution concentrate of claim 1, wherein said gum is a natural gum.

3. The fountain solution concentrate of claim 2, wherein said natural gum is Gum Arabic.

4. The fountain solution concentrate of claim 1, wherein said glycol is propylene glycol.

5. The fountain solution concentrate of claim 1, wherein said catalytic cross-linking agent is an organic titanate compound.

6. The fountain solution concentrate of claim 5, wherein said organic titanate compound is a titanate chelate.

7. The fountain solution concentrate of claim 1, wherein said concentrate is acidic.

8. The fountain solution concentrate of claim 7, wherein said concentrate has a pH between about 3 and about 5.

9. The fountain solution concentrate of claim 8, wherein said concentrate has a pH between about 4 and about 5.

10. A fountain solution concentrate for transporting a catalytic, cross-linking agent to lithographic printing ink and infusing said catalytic, cross-linking agent into said ink, said fountain solution concentrate consisting essentially of water, gum, glycol, a catalytic cross-linking agent adapted to cross-link said ink upon exposure to ultraviolet radiation, infrared radiation, blowing hot air, blowing cold air, or any combination thereof, and one or more of the following: a tackifier, a pH adjuster, and a blending agent.

11. The fountain solution concentrate of claim 10, wherein said gum is a natural gum.

12. The fountain solution concentrate of claim 11, wherein said natural gum is Gum Arabic.

13. The fountain solution concentrate of claim 10, wherein said glycol is propylene glycol.

14. The fountain solution concentrate of claim 10, wherein said catalytic cross-linking agent is an organic titanate compound.

15. The fountain solution concentrate of claim 14, wherein said organic titanate compound is a titanate chelate.

16. The fountain solution concentrate of claim 10, wherein said concentrate is acidic.

17. The fountain solution concentrate of claim 16, wherein said concentrate has a pH between about 3 and about 5.

18. The fountain solution concentrate of claim 17, wherein said concentrate has a pH between about 4 and about 5.

19. The fountain solution concentrate of claim 10, wherein said tackifier comprises sugar.

20. The fountain solution concentrate of claim 10, wherein said pH adjuster comprises citric acid, phosphoric acid and ammonia.

21. The fountain solution concentrate of claim 10, wherein said blending agent comprises propylene glycol methyl ether.

22. A process for imparting catalytic, cross-linking qualities to ink in a lithographic printing process having a dampening system for providing a fountain solution to said process and an inking system for providing ink to said process, comprising the steps of:

introducing into said dampening system a fountain solution concentrate consisting essentially of water, gum, glycol and a catalytic cross-linking agent adapted to cross-link said ink upon exposure to ultraviolet radiation, infrared radiation, blowing hot air, blowing cold air, or any combination thereof;

transporting said catalytic, cross-linking agent to said ink via said fountain solution; and, infusing said catalytic, cross-linking agent into said ink.

23. The process of claim 22, wherein said catalytic, cross-linking agent is an organic titanate compound.

24. The process of claim 23, wherein said organic titanate compound is a titanate chelate.

25. The process of claim 22, further comprising the step of introducing said fountain solution concentrate into said inking system.

26. The process of claim 25, wherein said catalytic, cross-linking agent is an organic titanate compound.

27. The process of claim 26, wherein said organic titanate compound is a titanate chelate.

28. A process for imparting catalytic, cross-linking qualities to ink in a lithographic printing process having a dampening system for providing a fountain solution to said process and an inking system for providing ink to said process, comprising the steps of:

introducing into said dampening system a fountain solution concentrate consisting essentially of water, gum, glycol, a catalytic cross-linking agent adapted to cross-link said ink upon exposure to ultraviolet radiation, infrared radiation, blowing hot air, blowing cold air, or any combination thereof, and one or more of the following: a tackifier, a pH adjuster and a blending agent, transporting said catalytic, cross-linking agent to said ink via said fountain solution; and, infusing said catalytic, cross-linking agent into said ink.

29. The process of claim 28, wherein said catalytic, cross-linking agent is an organic titanate compound.

30. The process of claim 29, wherein said organic titanate compound is a titanate chelate.

31. The process of claim 28, further comprising the step of introducing said fountain solution concentrate into said inking system.

32. The process of claim 31, wherein said catalytic, cross-linking agent is an organic titanate compound.

33. The process of claim 32, wherein said organic titanate compound is a titanate chelate.

* * * * *